US007587691B2

(12) United States Patent
Sutjahjo et al.

(10) Patent No.: US 7,587,691 B2
(45) Date of Patent: Sep. 8, 2009

(54) METHOD AND APPARATUS FOR FACILITATING VARIATION-AWARE PARASITIC EXTRACTION

(75) Inventors: Edhi Sutjahjo, Cupertino, CA (US);
Kishore Singhal, Milpitas, CA (US);
Byungwook Kim, Los Altos Hills, CA (US); Goetz Leonhardt, San Jose, CA (US); Beifang Qiu, Sunnyvale, CA (US);
Sergey Krasnovsky, Portland, OR (US);
Baribrata Biswas, San Jose, CA (US);
Alex Gyure, San Jose, CA (US);
Mahmoud Shahram, Cupertino, CA (US)

(73) Assignee: Synopsys, Inc., Mountain View, CA (US)

( * ) Notice: Subject to any disclaimer, the term of this patent is extended or adjusted under 35 U.S.C. 154(b) by 163 days.

(21) Appl. No.: 11/599,145

(22) Filed: Nov. 14, 2006

(65) Prior Publication Data
US 2007/0124707 A1 May 31, 2007

Related U.S. Application Data

(60) Provisional application No. 60/740,487, filed on Nov. 29, 2005.

(51) Int. Cl.
*G06F 17/50* (2006.01)
(52) U.S. Cl. ....................... 716/4; 716/5; 716/6; 703/19
(58) Field of Classification Search ................. 716/4–7, 716/19–21, 12; 703/19
See application file for complete search history.

(56) References Cited

U.S. PATENT DOCUMENTS

| 6,587,997 | B1 * | 7/2003 | Chen et al. ..................... 716/4 |
| 7,093,206 | B2 * | 8/2006 | Anand et al. ................... 716/1 |
| 2005/0251770 | A1 * | 11/2005 | Frank et al. .................... 716/5 |
| 2006/0161412 | A1 * | 7/2006 | Angyal et al. ................. 703/14 |
| 2006/0271891 | A1 * | 11/2006 | Rautio ........................... 716/5 |
| 2007/0061771 | A1 * | 3/2007 | Habitz et al. .................. 716/21 |

OTHER PUBLICATIONS

"Interconnect Parasitic Extraction in the Digita; Design Methology", by Mattan Kamon, Steve McCormick, Ken Shepard, p. 223-230—IEEE @1999.*

* cited by examiner

*Primary Examiner*—Paul Dinh
*Assistant Examiner*—Nha T Nguyen
(74) *Attorney, Agent, or Firm*—Park, Vaughan & Fleming LLP (57) ABSTRACT

One embodiment of the present invention provides a system for determining an electrical property for an interconnect layer. During operation, the system receives interconnect technology data which includes nominal parameter values for a first interconnect layer, and parameter-variation values which represent variations in the nominal parameter values due to random process variations. Next, the system receives an interconnect template which describes the geometry of a portion of a second interconnect layer. The system then determines electrical property data for the interconnect template using the interconnect technology data. The electrical property data can include a nominal electrical property value, and sensitivity values which represent the sensitivities of the nominal electrical property value to variations in the nominal parameter values. Next, the system stores the electrical property data and the interconnect technology data in a storage.

18 Claims, 5 Drawing Sheets

**INTERCONNECT TEMPLATE
CROSS-SECTION
500**

FIG. 5

| IDENTIFIER | NOMINAL VALUE | VARIATION | RELATED DIELECTRIC |
|---|---|---|---|
| M6 | 3100 Å | FIXED | NONE |
| IMD6A | 2400 Å | ±10% | K2 |
| IMD5C | 500 Å | ±5% | K1 |
| IMD5B AND M5T | 3100 Å | ±15% | K2 |
| IMD5A | 2400 Å | ±10% | K2 |
| IMD4C | 500 Å | ±5% | K1 |
| M4 | 3100 Å | FIXED | NONE |
| M5W | MINIMUM WIDTH | ±10% | NONE |

602

| DIELECTRIC | NOMINAL VALUE | VARIATION |
|---|---|---|
| K1 | 4.5 | ±2% |
| K2 | 2.9 | ±2% |

ELECTRICAL PROPERTY DATA

| | VALUE | SENSITIVITIES | | | | | | | |
|---|---|---|---|---|---|---|---|---|---|
| | | IMD4C | IMD5A | IMD5B M5T | IMD5C | IMD6A | K1 | K2 | M5W |
| LEFT CAP | 87.5 | | | 3.3 | | | | | 4.2 |
| RIGHT CAP | 87.5 | | | 3.3 | | | | 0.5 | 4.2 |
| TOP CAP | 25.0 | | | | | -0.7 | | | |
| BOTTOM CAP | 25.0 | | -0.7 | | | | | | |

FIG. 7

INDEX

| IMD4C | 0 |
|---|---|
| IMD5A | 1 |
| IMD5B M5T | 2 |
| IMD5C | 3 |
| IMD6A | 4 |
| K1 | 5 |
| K2 | 6 |
| M5W | 7 |

ELECTRICAL PROPERTY DATA

| LEFT CAP | 87.5 | 2 | 3.3 | 7 | 4.2 | | |
|---|---|---|---|---|---|---|---|
| RIGHT CAP | 87.5 | 2 | 3.3 | 6 | 0.5 | 7 | 4.2 |
| TOP CAP | 25.0 | 4 | -0.7 | | | | |
| BOTTOM CAP | 25.0 | 1 | -0.7 | | | | |

FIG. 8

METHOD AND APPARATUS FOR FACILITATING VARIATION-AWARE PARASITIC EXTRACTION

RELATED APPLICATION

This application hereby claims priority under 35 U.S.C. §119 to U.S. Provisional Patent Application No. 60/740,487, filed on 29 Nov. 2005, entitled "Efficient generation and representation of statistical sensitivity coefficients for variation-aware parasitic extraction," by inventors Edhi Sutjahjo, Kishore Singhal, Byungwook Kim, Baribrata Biswas, Alex Gyure, and Mahmoud Shahram, the contents of which are herein incorporated by reference.

BACKGROUND

1. Field of the Invention

The present invention relates to semiconductor design and manufacturing. More specifically, the present invention relates to a method and an apparatus for facilitating variation-aware parasitic extraction.

2. Related Art

Process variation related yield loss is becoming dominant in nanometer technologies. Higher circuit speeds and increasing relative variations in the design parameters have created a strong need for variation-aware tools, such as, variation aware static timing analysis (VA-STA). Further, simulation-based analysis of integrated circuits is typically performed using spice models for devices and interconnect models for wires. Both of these models must become variation aware for VA-STA to be practical.

Full-chip parasitic extraction usually employs a template matching approach which involves generating capacitance tables using a set of capacitance models which are associated with frequently encountered interconnect templates. Unfortunately, generating capacitance tables typically requires vast amounts of computation because of at least two reasons. First, a large number of interconnect templates are required to adequately cover the geometries that are usually encountered in an integrated circuit. Second, determining the parasitic capacitance for each interconnect template involves generating and solving large sets of simultaneous linear equations. Specifically, a numerical discretization technique such as BEM (Boundary Element Method), FDM (Finite Difference Method), FEM (Finite Element Method), can be used for generating these sets of simultaneous linear equations. The numerical discretization technique generates simultaneous linear equations by discretizing the Laplacian of the partial differential equations that describe the capacitance for an interconnect template. The simultaneous linear equations can then be solved using a linear equation solver.

Note that determining the capacitance of a single interconnect template can involve solving a system of linear equations that contains thousands of variables. Further, capacitance tables usually contain hundreds of thousands of interconnect templates to adequately cover all the interconnect configurations. Consequently, generating capacitance tables usually requires solving hundreds of millions of systems of linear equations. This can be an enormously time consuming process even for today's high performance computers. Furthermore, advances in process technologies are expected to result in more complex geometries, larger number of metal layers, and more stringent accuracy requirements. All of these developments will further increase the computational demands.

A single set of capacitance tables may be sufficient if the process parameters are deterministic, i.e., the parameters do not have any variation. Unfortunately, process parameters often vary from their nominal values due to random variations in the manufacturing processes. Prior art capacitance extraction techniques can be used to model parameter variation by generating capacitance tables for a large number of process corners. It is evident that such approaches will require an almost infeasible amount of computation. Hence, for all practical purposes, generating capacitance tables for a sufficiently large number of process corners is computationally infeasible.

To overcome the computational burden, some prior art techniques sacrifice accuracy. For example, in a process corner based approach, perfectly correlated extreme variations can be used for all metal and dielectric layers. Unfortunately, the perfect correlation assumption is unrealistic because these process steps occur at different times in the fabrication flow, and hence are independent of one another. Further, there is no guarantee that the combinations of extreme parameter variations cover the actual best-case or worst-case scenarios in terms of timing delay or crosstalk analysis.

Hence, what is needed is a method and an apparatus for facilitating variation-aware parasitic extraction.

SUMMARY

One embodiment of the present invention provides an approach to efficiently and accurately generate statistical sensitivity coefficients to complement the nominal capacitance tables and to use the statistical sensitivity coefficients for variation-aware parasitic extraction.

An embodiment of the present invention does not generate capacitance tables for different process corners. Instead, the embodiment efficiently generates statistical sensitivity coefficients which model the expected change in an electrical property (e.g., capacitance) due to variations in an interconnect process parameter value (e.g., dielectric thickness). Note that, a sensitivity coefficient with respect to a process parameter is the fractional change of an electrical property value due to a unit variation in the process parameter.

The nominal electrical property tables along with the associated statistical sensitivity coefficients can provide the necessary and sufficient coverage for all possible effects of parameter variations on an electrical property. In this way, embodiments of the present invention can provide a practical technique to cover all possible ranges of random parameter variation.

Note that statistical sensitivity coefficients are typically useful when the parameter variations are small. In mature semiconductor manufacturing processes, a large part of the process variation tends to be systematic, which can be modeled by using deterministic process models. As a result, the random component in a parameter variation is typically small, thereby permitting the use of statistical sensitivity coefficients.

In one embodiment, the system first generates the set of nominal capacitance tables. This usually involves a numerical discretization process to set up the simultaneous algebraic equations, a matrix factorization process, and substitution steps to obtain the nominal capacitance tables. Next, the system determines statistical sensitivity coefficients by reusing significant portions of the intermediate results that were generated during the nominal capacitance computations. This aspect of the present invention enables the system to generate sensitivity coefficients by using a substantially small amount of computation.

DETAILED DESCRIPTION

Integrated Circuit Design Flow

Figure 1:
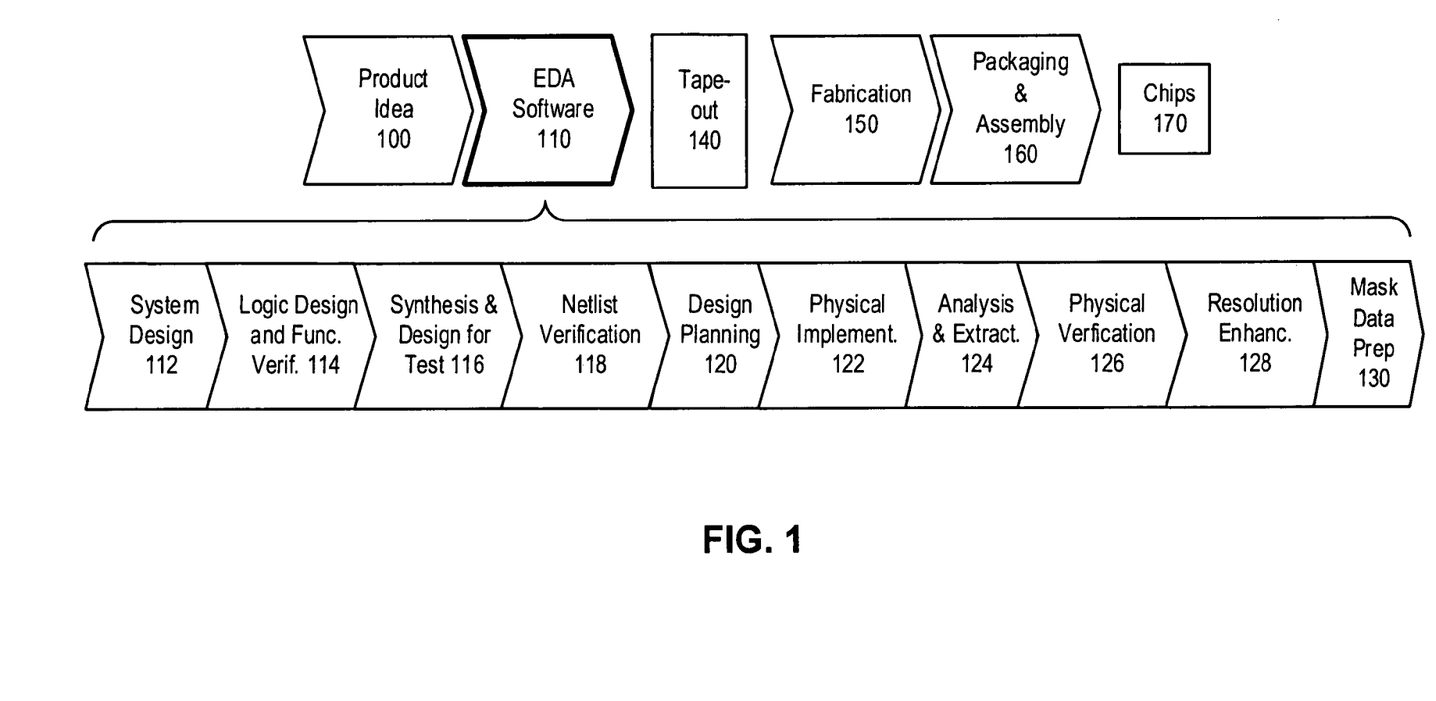
FIG. 1 illustrates various steps in the design and fabrication of an integrated circuit in accordance with an embodiment of the present invention.

FIG. 1 illustrates various steps in the design and fabrication of an integrated circuit in accordance with an embodiment of the present invention.

The process can start with the conception of the product idea (step 100) which may be realized using an EDA design process (step 110). When the design is finalized, it can be taped-out (event 140). After tape out, the fabrication process (step 150) and packaging and assembly processes (step 160) are performed which ultimately result in finished chips (result 170).

The EDA design process (step 110), in turn, can comprise steps 112-130, which are described below. Note that the design flow description is for illustration purposes only. This description is not meant to limit the present invention. For example, an actual integrated circuit design may require the designer to perform the design steps in a different sequence than the sequence described below. The following discussion provides further details of the steps in the design process.

System design (step 112): In this step, the designers describe the functionality that they want to implement. They can also perform what-if planning to refine functionality, check costs, etc. Hardware-software architecture partitioning can occur at this stage. Exemplary EDA software products from Synopsys, Inc. that can be used at this step include Model Architect, Saber, System Studio, and DesignWare® products.

Logic design and functional verification (step 114): At this stage, the VHDL or Verilog code for modules in the system is written and the design is checked for functional accuracy. More specifically, the design is checked to ensure that it produces the correct outputs. Exemplary EDA software products from Synopsys, Inc. that can be used at this step include VCS, VERA, DesignWare®, Magellan, Formality, ESP and LEDA products.

Synthesis and design for test (step 116): Here, the VHDL/Verilog is translated to a netlist. The netlist can be optimized for the target technology. Additionally, tests can be designed and implemented to check the finished chips. Exemplary EDA software products from Synopsys, Inc. that can be used at this step include Design Compiler®, Physical Compiler, Test Compiler, Power Compiler, FPGA Compiler, Tetramax, and DesignWare® products.

Netlist verification (step 118): At this step, the netlist is checked for compliance with timing constraints and for correspondence with the VHDL/Verilog source code. Exemplary EDA software products from Synopsys, Inc. that can be used at this step include Formality, PrimeTime, and VCS products.

Design planning (step 120): Here, an overall floorplan for the chip is constructed and analyzed for timing and top-level routing. Exemplary EDA software products from Synopsys, Inc. that can be used at this step include Astro and IC Compiler products.

Physical implementation (step 122): The placement (positioning of circuit elements) and routing (connection of the same) occurs at this step. Exemplary EDA software products from Synopsys, Inc. that can be used at this step include the Astro and IC Compiler products.

Analysis and extraction (step 124): At this step, the circuit function is verified at a transistor level, this in turn permits what-if refinement. Exemplary EDA software products from Synopsys, Inc. that can be used at this step include AstroRail, PrimeRail, Primetime, HSPICE, HSPICE RF, NanoSim, HSIM, and Star RCXT products.

Physical verification (step 126): In this step, the design is checked to ensure correctness for manufacturing, electrical issues, lithographic issues, and circuitry. Exemplary EDA software products from Synopsys, Inc. that can be used at this step include the Hercules product.

Resolution enhancement (step 128): This step involves geometric manipulations of the layout to improve manufacturability of the design. Exemplary EDA software products from Synopsys, Inc. that can be used at this step include Proteus, ProteusAF, and PSMGen products.

Mask data preparation (step 130): This step provides the "tape-out" data for production of masks to produce finished chips. Exemplary EDA software products from Synopsys, Inc. that can be used at this step include the CATS(R) family of products.

Embodiments of the present invention can be used during one or more of the above-described steps. Specifically, one embodiment of the present invention can be used during the analysis and extraction step 124.

Variation-Aware Parasitic Electrical Property Extraction

Figure 2:
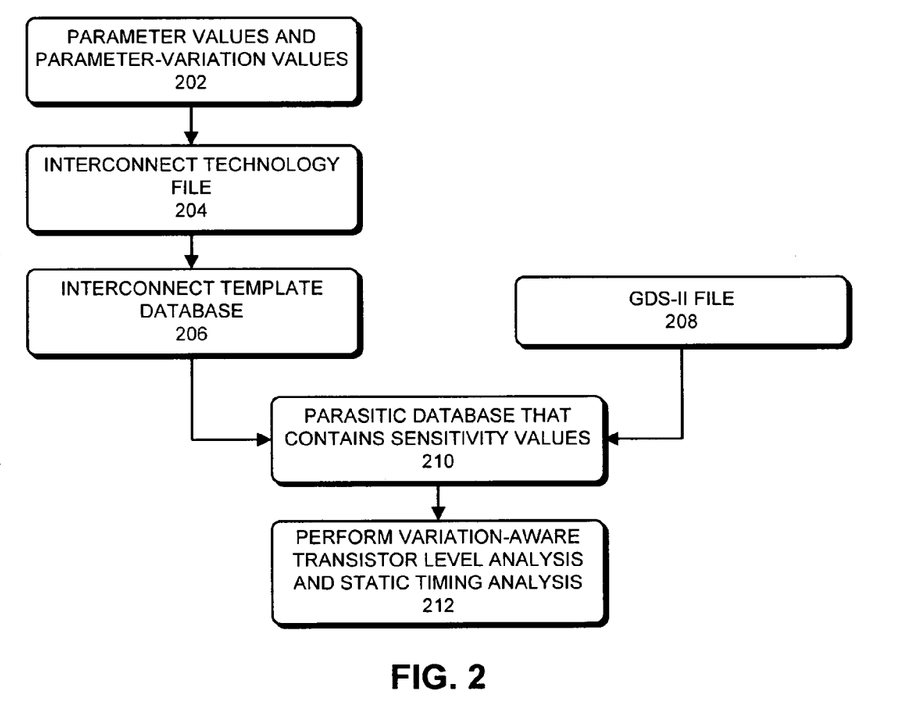
FIG. 2 presents a flowchart that illustrates a process for variation-aware parasitic electrical property extraction in accordance with an embodiment of the present invention.

FIG. 2 presents a flowchart that illustrates a process for variation-aware parasitic electrical property extraction in accordance with an embodiment of the present invention.

The process typically begins by receiving parameter values and parameter-variation value (step 202).

The parameter values and the parameter-variation values are usually specific to the semiconductor manufacturing processes that are used to manufacture the semiconductor chip.

Figure 3:
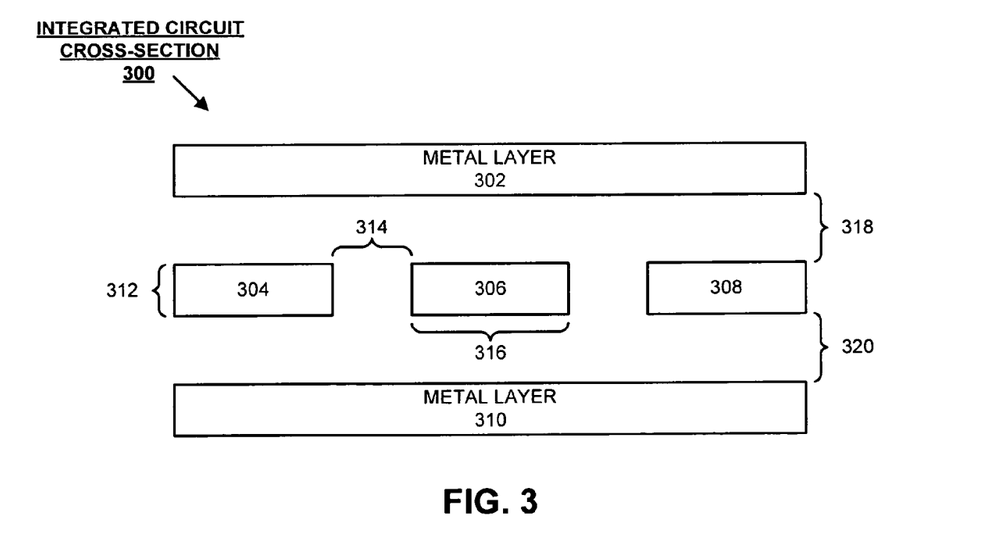
FIG. 3 illustrates a cross section of the wiring layers of an integrated circuit in accordance with an embodiment of the present invention.

FIG. 3 illustrates a cross section of the wiring layers of an integrated circuit in accordance with an embodiment of the present invention.

Integrated circuit cross-section 300 illustrates three metal layers of an integrated circuit. Structures 302 and 310 are part of the top and the bottom metal layers, respectively. Structures 304, 306, and 308 are part of the middle metal layer. Note that an integrated circuit may have more or less metal layers.

The semiconductor manufacturing processes used by a foundry can be characterized by parameters such as the width and thickness of the resulting metal wires, the distance between the metal layers, and the dielectric constant of the material between the metal layers. For example, the parameter values received from the foundry can include line thickness 312, distance 314 between two lines, line width 316, thickness 318 of the dielectric material between the top metal layer and the middle metal layer, and thickness 320 of the dielectric material between the bottom metal layer and the middle metal layer.

In prior art techniques, these parameter values and parameter-variation values are used to generate a set of process corners. In contrast to prior art techniques, embodiments of the present invention do not have to generate a set of process corners. Instead, embodiments of the present invention determine sensitivity values for the parasitic electrical properties of an interconnect layer. For example, an embodiment determines the sensitivity of the parasitic capacitance of an interconnect layer to variations in parameter values.

Next, the system can use the information received from the foundry to generate an interconnect technology file or database (step 204). This file or database contains the nominal parameter values and the parameter-variation values. Prior art techniques generate a technology file for each process corner. This is a serious problem in prior art techniques because, to adequately capture the effect of parameter variations, prior art techniques need to generate a large number of interconnect technology files.

The system can then generate an interconnect template database which stores the value of a parasitic electrical property and the associated sensitivity values for a number of interconnect templates (step 206).

An interconnect template is a portion of an interconnect layer. The interconnect template database can store a number of parasitic electrical properties and the associated sensitivity values for each interconnect template. In one embodiment, the interconnect template database can be a ".nxtgrd" file which stores parasitic capacitance values and the associated sensitivity values for a number of interconnect templates.

Generating an interconnect template database usually requires a substantial amount of computational resources and storage. In prior art techniques, a separate interconnect template database is generated for each process corner. This is a serious problem in prior art techniques because generating each interconnect template database requires a substantial amount of computation. In contrast to prior art techniques, an embodiment of the present invention generates a single interconnect template database which stores the electrical property values and the associated sensitivity values.

Next, the system can receive a description of an interconnect layer (step 208). In one embodiment, the interconnect layer may be described using a "GDS-II" file or an "OASIS" file.

The system can then generate a parasitic-electrical-property database for the interconnect layer which contains the parasitic electrical properties values and the associated sensitivity values (step 210).

The system usually partitions the interconnect layer into a number of interconnect structures. Next, the system determines the parasitic electrical property value (e.g., parasitic capacitance) and the associated sensitivity values of each interconnect structure by matching the interconnect structure with the interconnect templates that are stored in the interconnect template database. If an interconnect structure does not match an interconnect template exactly, the system may interpolate between two or more interconnect templates to determine the electrical property value and the associated sensitivity values.

The resulting parasitic-electrical-property database can be used in a number of applications. For example, the parasitic-electrical-property database can be used to perform variation-aware transistor level analysis and static timing analysis (step 212). In particular, the parasitic-electrical-property database can be used by tools such as PrimeTime (a static timing analysis tool) and HSPICE (a circuit simulation tool).

Recall that prior art techniques typically determine worst-case and best-case corners by assuming that extreme variations of all metal and dielectric layers are perfectly correlated. However, there is no guarantee that the combinations of extreme parameter variations will result in the best-case or worst-case scenarios in terms of timing delay or crosstalk analysis.

In contrast to prior art techniques, embodiments of the present invention can use the electrical-property database to determine worst-case and best-case process corners for a given electrical property. One embodiment can use an optimization technique to determine the set of parameter values that maximizes or minimizes a given electrical property. For example, an optimization technique can be used to determine the process corner that maximizes the parasitic capacitance, which can be associated with the worst-case scenario for timing analysis. Similarly, an embodiment can be used to determine the process corner that maximizes power dissipation.

Process for Determining an Electrical Property for an Interconnect Layer

Figure 4:
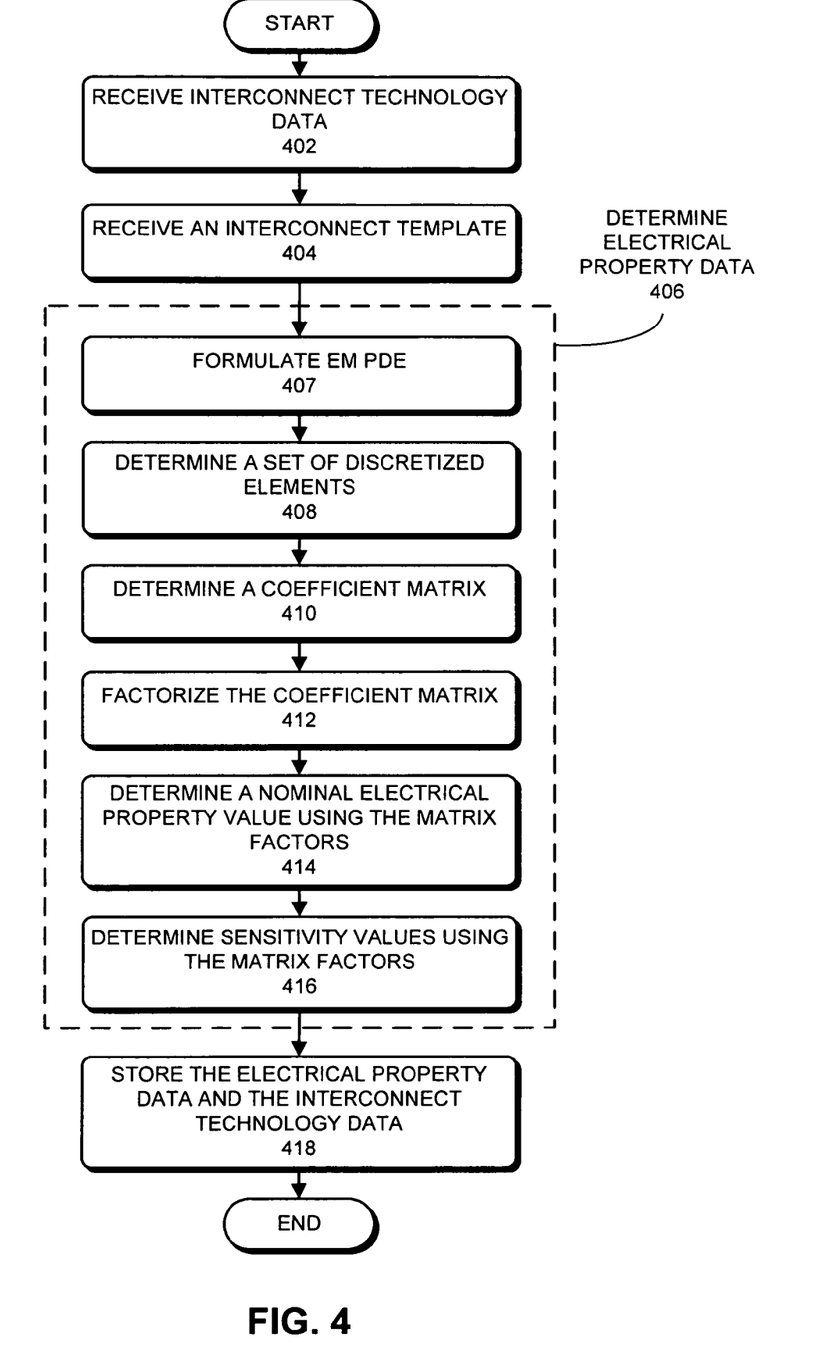
FIG. 4 presents a flowchart that illustrates a process for determining an electrical property for an interconnect layer in accordance with an embodiment of the present invention.

FIG. 4 presents a flowchart that illustrates a process for determining an electrical property for an interconnect layer in accordance with an embodiment of the present invention.

The process typically begins by receiving interconnect technology data which includes nominal parameter values for an interconnect layer, and parameter-variation values which represent variations in the nominal parameter values due to random process variations (step 402).

The nominal parameter values can include a metal thickness value, a dielectric thickness value, a line width value, a line spacing value, a dielectric constant value, and/or a resistivity value.

Next, the system receives an interconnect template which describes the geometry of a portion of an interconnect layer (step 404).

Figure 5:
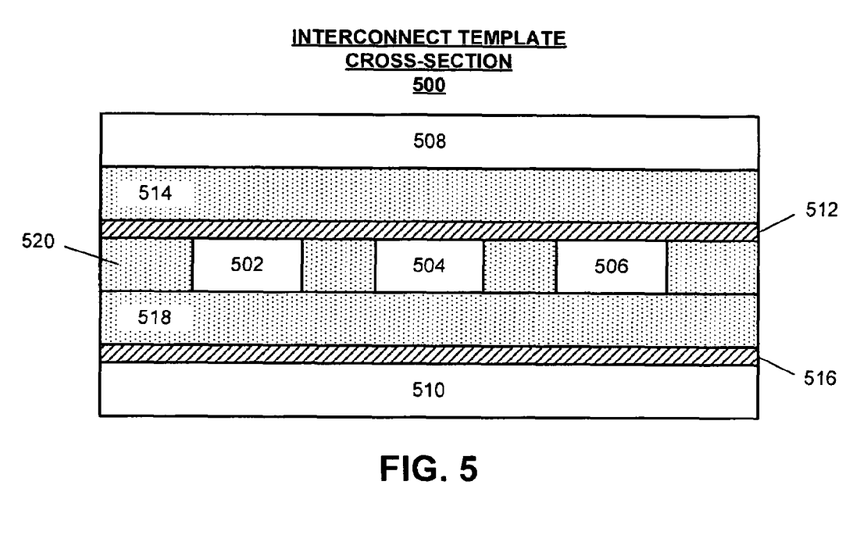
FIG. 5 illustrates an interconnect template cross-section in accordance with an embodiment of the present invention.

FIG. 5 illustrates an interconnect template cross-section in accordance with an embodiment of the present invention.

An integrated circuit can include a number of interconnect layers which are typically separated from one another by one or more layers of dielectrics. Interconnect template cross-section 500 illustrates three metal layers of an integrated circuit. Structures 502, 504, and 506 are part of the middle metal layer which is interposed between top metal layer 508 and bottom metal layer 510. Dielectric layers 512 and 514 are located between top metal layer 508 and the middle metal layer. Dielectric layers 516 and 518 are located between bottom metal layer 510 and the middle metal layer. Dielectric material 520 is located between structures 502, 504, and 506 in the middle metal layer.

Figure 6:
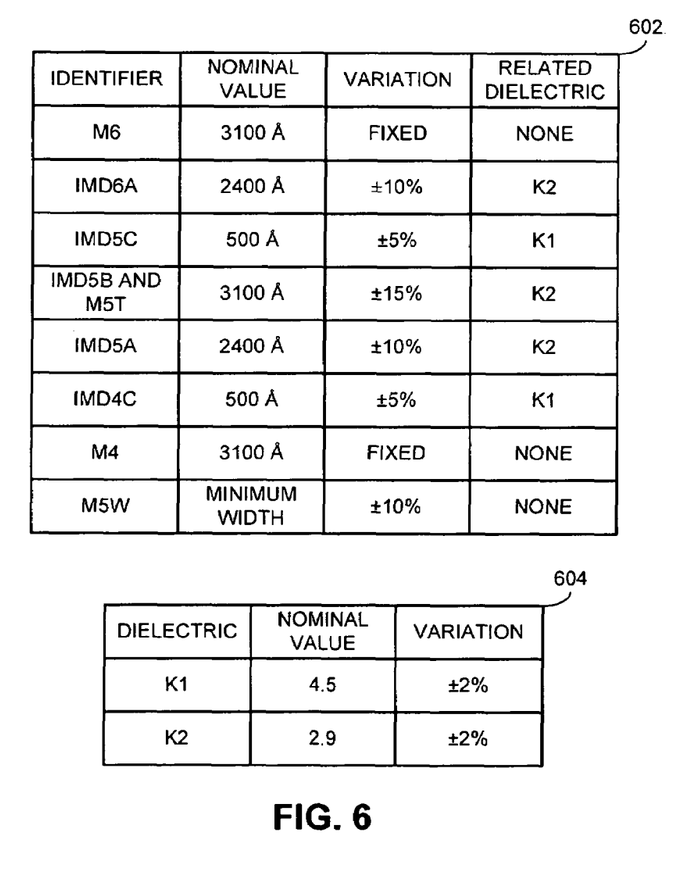
FIG. 6 illustrates interconnect technology data in accordance with an embodiment of the present invention.

FIG. 6 illustrates interconnect technology data in accordance with an embodiment of the present invention.

Interconnect technology data shown in FIG. 6 is organized in a table format, namely in tables 602 and 604. The first (i.e., leftmost) column in table 602 contains parameter identifiers. The data items in each row are associated with the parameter specified in the first column. The first (i.e., top) row in tables 602 and 604 contain the column headers.

The parameter identifiers in the first column can be associated with the layers and structures shown in FIG. 5. For example, parameter M6 can indicate the thickness of top metal layer 508, parameter IMD6A can indicate the thickness of dielectric layer 514, parameter IMD5C can indicate the thickness of dielectric layer 512, parameters IMD5B can indicate the thickness of dielectric material 520, parameter M5T can indicate the thickness of the middle metal layer which includes structures 502, 504, and 506, parameter IMD5A can indicate the thickness of dielectric layer 518, parameter IMD4C can indicate the thickness of dielectric layer 516, and parameter M4 can indicate the thickness of bottom metal layer 510. Further, M5W can indicate the minimum line width in the integrated circuit which can be equal to the widths of structures 502, 504, and 506.

The second column in table 602 can contain nominal values for the parameters specified in the first column. For example, as shown in table 602, the nominal value for parameter M6 is 3100 Å, i.e., the nominal thickness of top metal layer 508 is equal to 3100 Å. Some parameter values may specify a text string instead of a number. For example, the nominal value associated with parameter M5W is "minimum width" which may be equal to 65 nm.

The third column in table 602 can contain parameter-variation values for the parameters specified in the first column. For example, the parameter-variation value for parameter IMD6A is ±10%, i.e., the parameter IMD6A can vary within ±10% of its nominal value. In one embodiment, the parameter-variation value represents the maximum amount by which the parameter can vary. In another embodiment, the parameter-variation value can represent a 95% confidence interval for the associated parameter value. Some parameter values may not have any variation. For example, parameter M6 does not have any variation, and hence the third column contains the text "fixed."

The fourth column in table 602 can specify a dielectric parameter that is associated with the parameter specified in the first column. For example, the fourth column indicates that parameter IMD6A is associated with dielectric parameter K2. Table 604 provides the nominal parameter values and parameter-variation values for the dielectric parameters. Specifically, table 604 indicates that dielectric parameter K2 has a nominal value of 2.9 and a variation value of ±2%. Hence, taken together, tables 602 and 604 indicate that dielectric layer 514 (which is associated with parameter IMD6A) has a nominal thickness of 2400 Å and a nominal dielectric constant of 2.9. Some parameters may not be associated with any dielectric material. For example, parameter M6 which is associated with top metal layer 508 is not associated with any dielectric material, and hence the fourth column for parameter M6 contains the text string "none."

The foregoing description of interconnect technology data has been presented only for purposes of illustration and description. Specifically, the foregoing description is not intended to be exhaustive or to limit the present invention to the forms disclosed. Accordingly, many modifications and variations will be readily apparent to practitioners skilled in the art. For example, the interconnect technology data may be represented using XML (Extensible Markup Language).

Continuing with the discussion of FIG. 4, the system then determines electrical property data for the interconnect template using the interconnect technology data (step 406).

Specifically, the electrical property data includes a nominal electrical property value, and sensitivity values which represent the sensitivities of the nominal electrical property value to variations in the nominal parameter values. The nominal electrical property value can be a capacitance value, a resistance value, an inductance value, or a reluctance value. Note that the nominal electrical property value represents the value of an electrical property of an interconnect structure whose geometry is the same as the geometry of the interconnect template, and whose parameter values are equal to the nominal parameter values.

Figure 7:
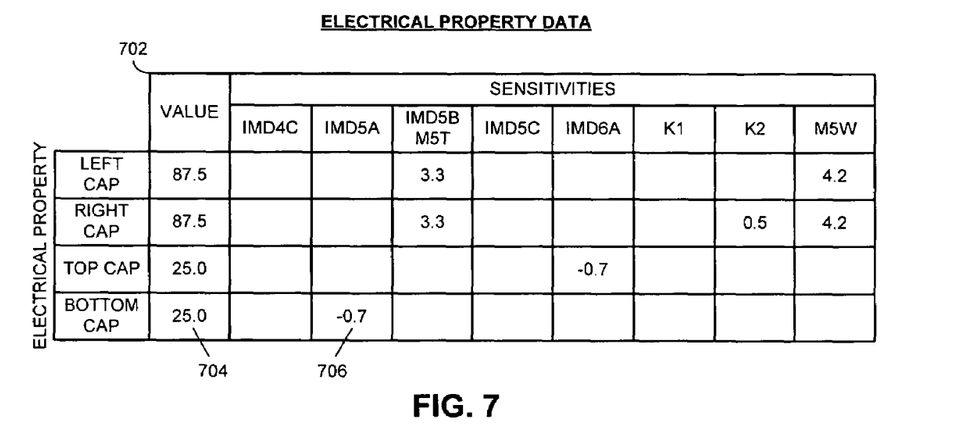
FIG. 7 illustrates electrical property data for an interconnect template in accordance with an embodiment of the present invention.

FIG. 7 illustrates electrical property data for an interconnect template in accordance with an embodiment of the present invention.

Table 702 contains exemplary electrical property data for the interconnect template shown in FIG. 5. The rows in table 702 correspond to electrical properties, whereas the columns correspond to the nominal electrical property values or the sensitivity values. Specifically, the first row (i.e., the first row after the column header row) corresponds to the capacitance between structures 502 and 504, the second row corresponds to the capacitance between structures 504 and 506, the third row corresponds to the capacitance between structure 504 and top metal layer 508, and the fourth row corresponds to the capacitance between structure 504 and the bottom metal layer 510.

Table 702 can also contain electrical properties other than capacitance. For example, a row may correspond to the resistivity of structure 504. Alternatively, a row may correspond to the equivalent capacitance between structure 504 and top metal layer 508.

A cell in table 702 either represents a nominal electrical property value or a sensitivity value. For example, cell 704 contains a nominal electrical property value which represents the nominal capacitance between structure 504 and bottom metal layer 510. On the other hand, cell 706 contains a sensitivity value which represents the sensitivity of the capacitance between structure 504 and bottom metal layer 510 to the parameter IMD5A which is associated with the thickness of dielectric layer 518. The empty cells are associated with sensitivity values that have negligible magnitudes.

Figure 8:
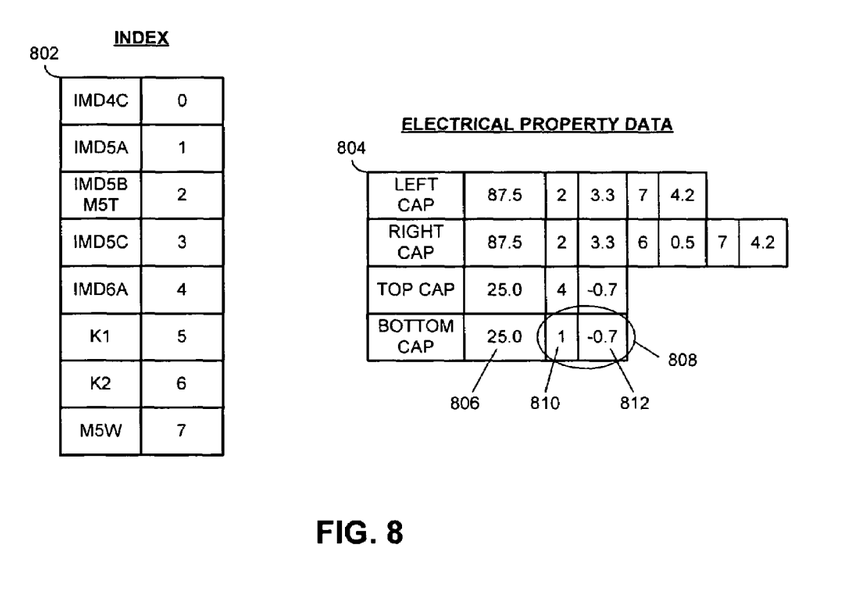
FIG. 8 illustrates compressed electrical property data for an interconnect template in accordance with an embodiment of the present invention.

FIG. 8 illustrates compressed electrical property data for an interconnect template in accordance with an embodiment of the present invention.

Table 702 contains a number of empty cells which can take up unnecessary memory space. The electrical property data in table 702 can be compressed using a generic compression technique. Alternatively, memory can be saved by representing the electrical property data using a different format as shown in FIG. 8.

Table 802 contains an index which associates a number with each parameter identifier. For example, IMD4C can be associated with "0," IMD5A can be associated with "1," and so on. Table 804 represents the electrical property data using the indices defined in table 802. As in table 702, each row in table 804 is associated with an electrical property. For example, the first row in table 804 is associated with the capacitance between structures 504 and 502. Also, as in table 702, each column in table 804 is associated with either a nominal electrical property value or a sensitivity value. For example, cell 806 is a nominal electrical property value which represents the nominal capacitance between structure 504 and bottom metal layer 510. On the other hand, cell 808 contains a sensitivity value which represents the sensitivity of the capacitance between structure 504 and bottom metal layer 510 to the parameter IMD5A which is associated with the thickness of dielectric layer 518. Cell 808 contains two fields, namely field 810 and 812. Field 810 contains the index of parameter IMD5A as defined in table 802, and field 812 contains the sensitivity value. Note that field 810 can be stored using a single byte if the number of parameters are less than or equal to $2^8$. Further, note that table 804 does not contain empty cells.

Continuing with the discussion of FIG. 4, the system can determine the electrical property data using a numerical discretization technique. Specifically, the system can formulate the EM (electromagnetic) PDEs (partial differential equations) that describe the electromagnetic field in the interconnect template (step 407). The system can then discretize the PDEs to determine a set of discretized elements for the interconnect template (step 408).

Next, the system can determine a coefficient matrix using the set of discretized elements (step 410).

If the electrical property being calculated is capacitance, the coefficient matrix represents a relationship between the discretized element charges and the discretized element voltages. Specifically, the relationship between the coefficient matrix, the discretized element charges, and the discretized element voltages can be represented using the expression Pq=v, where P is the coefficient matrix, q is a vector of discretized element charges, and v is a vector of discretized element voltages. Typically, the formation of the coefficient matrix, P, and the solution of the charge vector, q, are the most time consuming parts of nominal capacitance computation. Once the discretized element charges are known, the nominal capacitance, Co, can be represented using the expression $c_0$=Tq, where T is a transformation matrix that relates the discretized element charges to the total charge on the associated metal cross-section, which is the desired capacitance.

The system then factorizes the coefficient matrix to obtain a set of matrix factors (step 412). In one embodiment, the system performs LU decomposition to determine the set of matrix factors.

Next, the system determines the nominal electrical property value using the set of matrix factors (step 414).

In one embodiment, the system uses forward and back substitution to determine the nominal electrical property value using the set of matrix factors. Note that the nominal capacitance value is usually determined for each interconnect template.

The system then reuses the set of matrix factors to determine the sensitivity values (step 416).

The sensitivity of an electrical property can be represented using the expression:

$$\frac{\partial c}{\partial \delta_i} = -TP^{-1}\frac{\partial P}{\partial \delta_i}q,$$

where c is the capacitance and $\partial \delta_i$ represents an infinitesimal variation of parameter $\delta_i$. Note that the coefficient matrix and the associated set of matrix factors were determined when the nominal capacitance values were computed. The system reuses these matrix factors to determine the sensitivity values. Recall that determining the coefficient matrix and then factoring the coefficient matrix into a set of matrix factors are computationally intensive steps. By reusing the set of matrix factors for determining the sensitivity values, embodiments of the present invention are able to substantially reduce the amount of computation required to determine the sensitivity values. This is a substantial advantage over the prior art. Prior art techniques require generating a coefficient matrix and factorizing the coefficient matrix for each process corner. As a result, prior art techniques require substantially more computation (e.g., CPU cycles and/or time) than embodiments of the present invention.

In one embodiment, the system approximates $$\frac{\partial P}{\partial \delta_i}$$

by perturbing the set of matrix factors using the finite difference method. In other words, the system approximates $$\frac{\partial P}{\partial \delta_i}$$

by using the expression:

$$\frac{\partial P}{\partial \delta_i} \approx \frac{\Delta P}{\Delta \delta_i}.$$

In this embodiment, only selected elements of the coefficient matrix, P, are perturbed and, to further save computational resources, only these elements are computed during the formation of P, i.e., during the numerical discretization.

Alternatively, the partial derivative matrix $$\frac{\partial P}{\partial \delta_i}$$

can be determined analytically or by using numerical differentiation techniques.

In one embodiment, the system determines normalized sensitivity coefficients $$S_i = \left(\frac{\partial c}{\partial \delta_i}\frac{\sigma_i}{c_0}\right),$$

where $\sigma_i$ is the standard deviation of parameter i.

Capacitance values due to any random process variations can be computed using the normalized sensitivity coefficients as follows, $$c = c_0\left[1 + \sum_{1}^{n}\left(\frac{\partial c}{\partial \delta_i}\frac{\sigma_i}{c_0}\right)\frac{\Delta \delta_i}{\sigma_i}\right] \approx c_0\left[1 + \sum_{i \in I}^{n} S_i \Delta \xi_i\right] + \varepsilon,$$

where $\Delta \xi_i$ are random variations from distributions with unit variance and $\varepsilon$ is a random variable. $S_i$ values that are small in magnitude can be discarded from the summation, and their influence can be captured by the random variable $\varepsilon$. The index set I on the summation is sparse and corresponds to the parameters that are associated with the larger sensitivity values. (Further details on sensitivity analysis can be found in (1) F. H. Branin, "Network Sensitivity and Noise Analysis Simplified", *IEEE Transactions on Circuit Theory*, p. 285-288, 1973, and (2) J. Vlach and K. Singhal, *Computer Methods for Circuit Analysis and Design*, Chapter 6, Van Nostrand, 1983.)

With the availability of statistical sensitivity coefficients, the effects of parameter variations on capacitance values can be directly computed. Hence, it is no longer necessary to pre-compute extensive capacitance tables in anticipation of all possible parameter variations. This strategy of using normalized statistical sensitivity coefficients results in substantial savings in computing effort and storage.

Next, the system stores the electrical property data and the interconnect technology data in a storage (step 418).

In a practical nanometer design, there can be over a hundred random variables that influence interconnect properties. Storing and processing all sensitivity values associated with these random variables can be expensive in memory and disk space. For this reason, data compression can be applied to the electrical property data.

First, the sparse index set I can be represented as a compact string. As an example, the use of bitmaps is sufficient to store the indices of parameter variations.

Second, the accuracy required for storing the normalized statistical sensitivity coefficients is usually low. For example, errors of 0.1% to 0.5% are typically acceptable. In such cases, each $S_i$ can be stored in three significant digits using a simple coding scheme.

The storage can be a file, wherein interconnect template and the electrical property data are stored in the file such that the interconnect template is associated with the electrical property data. Alternatively, the storage can be associated with a database, wherein the interconnect template and the electrical property data are stored in the database such that the electrical property data can be queried using an identifier that is associated with the interconnect template.

The storage can then be used to perform variation-aware static timing analysis or transistor level simulation for an integrated circuit. Specifically, the system may receive a description of an interconnect layer. Next, the system may determine a set of interconnect structures using the description of the interconnect layer. The system can then use the storage to determine an electrical property value and a set of sensitivity values for an interconnect structure in the set of interconnect structures. Next, the system can generate a report which includes the electrical property value, and the set of sensitivity values.

To summarize, prior art parasitic extraction techniques do not account for random variations on physically quantifiable semiconductor design parameters such as metal layer thickness, dielectric layer thickness, dielectric constant, metal width, spacing between metals, etc. Prior art techniques generate electrical property (e.g., capacitance) tables for a large number of process corners which usually do not capture all the possible parameter variation scenarios. Prior art techniques produce results which are often overly optimistic or pessimistic and lead to design iterations due to chip failure or sub-optimal use of the technology capability. Specifically, prior art techniques do not cover the best-case and the worst-case scenarios from a static timing analysis perspective.

In contrast to prior art techniques, an embodiment of the present invention generates nominal capacitance tables and statistical sensitivity coefficients. An embodiment substantially reduces the amount of computation (CPU cycles and/or time) required to generate the tables by (a) extensively reusing the factorized matrices that were generated when the nominal capacitance table was computed, and by (b) selectively updating the elements in the coefficient matrix. The sensitivity values provide a consistent methodology for statistically assessing the effects of parameter variations on parasitic electrical properties. Further, embodiments of the present invention substantially reduce the amount of memory required during extraction and the amount of disk storage required for storing the nominal electrical property values and the sensitivity values. Specifically, the disk storage requirement can be reduced by applying two different data compaction techniques in sequence. The first technique is based on the physics of capacitance statistical sensitivity, while the second technique is based on compression technology. In particular, the first technique for storage reduction considers metal shielding effects to filter out negligibly small statistical sensitivity values without affecting accuracy. Only parameter variations that produce non-negligible sensitivity values are retained. One embodiment uses a bitmap to indicate the non-negligible variations. The second technique for storage reduction is based on a compressed representation of the filtered sensitivity values. The compressed representation can be designed to maintain a specified level of accuracy.

CONCLUSION

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Furthermore, the foregoing descriptions of embodiments of the present invention have been presented only for purposes of illustration and description. They are not intended to be exhaustive or to limit the present invention to the forms disclosed. Accordingly, many modifications and variations will be readily apparent to practitioners skilled in the art. Additionally, the above disclosure is not intended to limit the present invention. The scope of the present invention is defined by the appended claims.

What is claimed is:

1. A method for determining an electrical property for an interconnect layer, the method comprising:

receiving interconnect technology data which includes:
nominal parameter values for a first interconnect layer, wherein the nominal parameter values characterize semiconductor manufacturing processes that are used to manufacture the first interconnect layer, and
parameter-variation coefficients which represent variations in the nominal parameter values due to random process variations;

receiving an interconnect template which describes a geometry of a portion of the first interconnect layer;

using at least a computer to determine electrical property data for the interconnect template using the interconnect technology data, wherein determining the electrical property data involves:
determining a set of discretized elements for the interconnect template;
determining a coefficient matrix using the set of discretized elements;
factorizing the coefficient matrix to obtain a set of matrix factors;
determining a nominal electrical property value using the set of matrix factors, wherein the nominal electrical property value characterizes an electrical property of the interconnect template; and
reusing the set of matrix factors to determine the sensitivity coefficients which represent the sensitivities of the nominal electrical property value to variations in the nominal parameter values; and storing the electrical property data in a storage.

2. The method of claim 1, further comprising:
receiving a description of a second interconnect layer;
determining a set of interconnect structures using the description of the second interconnect layer, wherein the set of interconnect structures includes a first interconnect structure;
using the storage to determine a first electrical property value and a first set of sensitivity coefficients for the first interconnect structure; and
generating a report which includes the first electrical property value, and the first set of sensitivity coefficients.

3. The method of claim 1, further comprising using the storage to perform variation-aware static timing analysis for an integrated circuit.

4. The method of claim 1, further comprising using the storage to determine a process corner.

5. The method of claim 1,
wherein the storage is a file; and
wherein the electrical property data is stored in the file such that the electrical property data is associated with the interconnect template.

6. The method of claim 1,
wherein the storage is associated with a database; and
wherein the electrical property data is stored in the database such that the electrical property data can be queried using an identifier that is associated with the interconnect template.

7. The method of claim 1, wherein the nominal electrical property value is one of:
a capacitance value;
a resistance value;
an inductance value; and
a reluctance value.

8. The method of claim 1, wherein a nominal parameter value in the nominal parameter values is one of:
a metal thickness value;
a dielectric thickness value;
a line width value;
a line spacing value;
a dielectric constant value; and
a resistivity value.

9. A computer-readable storage medium storing instructions that when executed by a computer cause the computer to perform a method for determining an electrical property for an interconnect layer, the method comprising:
receiving interconnect technology data which includes:
nominal parameter values for a first interconnect layer, wherein the nominal parameter values characterize semiconductor manufacturing processes that are used to manufacture the first interconnect layer, and
parameter-variation coefficients which represent variations in the nominal parameter values due to random process variations;
receiving an interconnect template which describes a geometry of a portion of the first interconnect layer;
determine electrical property data for the interconnect template using the interconnect technology data, wherein determining the electrical property data involves:
determining a set of discretized elements for the interconnect template;
determining a coefficient matrix using the set of discretized elements;
factorizing the coefficient matrix to obtain a set of matrix factors;
determining a nominal electrical property value using the set of matrix factors, wherein the nominal electrical property value characterizes an electrical property of the interconnect template; and
reusing the set of matrix factors to determine the sensitivity coefficients which represent the sensitivities of the nominal electrical property value to variations in the nominal parameter values; and
storing the electrical property data in a storage.

10. The computer-readable storage medium of claim 9, wherein the method further comprises:
receiving a description of a second interconnect layer;
determining a set of interconnect structures using the description of the second interconnect layer, wherein the set of interconnect structures includes a first interconnect structure;
using the storage to determine a first electrical property value and a first set of sensitivity coefficients for the first interconnect structure; and
generating a report which includes the first electrical property value, and the first set of sensitivity coefficients.

11. The computer-readable storage medium of claim 9, wherein the method further comprises using the storage to perform variation-aware static timing analysis for an integrated circuit.

12. The computer-readable storage medium of claim 9, wherein the method further comprises using the storage to determine a process corner.

13. The computer-readable storage medium of claim 9,
wherein the storage is a file; and
wherein the electrical property data is stored in the file such that the electrical property data is associated with the interconnect template.

14. The computer-readable storage medium of claim 9,
wherein the storage is associated with a database; and
wherein the electrical property data is stored in the database such that the electrical property data can be queried using an identifier that is associated with the interconnect template.

15. The computer-readable storage medium of claim 9, wherein the nominal electrical property value is one of:
a capacitance value;
a resistance value;
an inductance value; and
a reluctance value.

16. The computer-readable storage medium of claim 9, wherein a nominal parameter value in the nominal parameter values is one of:
a metal thickness value;
a dielectric thickness value;
a line width value;
a line spacing value;
a dielectric constant value; and
a resistivity value.

17. A method for determining statistical sensitivity coefficients for variation-aware parasitic capacitance extraction, the method comprising:
receiving interconnect technology data which includes:
nominal parameter values for an interconnect layer, wherein the nominal parameter values characterize semiconductor manufacturing processes that are used to manufacture the interconnect layer, and
parameter-variation coefficients which represent variations in the nominal parameter values due to random process variations;
receiving an interconnect template which describes a geometry of a portion of the interconnect layer;
using at least a computer to determine an nominal capacitance value and capacitance sensitivity coefficients for the interconnect template using the interconnect technology data, wherein the determining, involves:

determine a set of discretized elements using the interconnect template;

determine a coefficient matrix which represents a relationship between the discretized element charges and the discretized element voltages;

factorize the coefficient matrix into a set of matrix factors;

determine a nominal capacitance value using the set of matrix factors, wherein the nominal capacitance value characterizes a capacitance of the interconnect template; and reuse the set of matrix factors to determine the capacitance sensitivity coefficients which represent the sensitivities of the nominal capacitance value to variations in nominal parameter values;

storing the nominal capacitance value and the capacitance sensitivity coefficients data in a storage.

18. A computer-readable storage medium storing instructions that when executed by a computer to perform a method for determining statistical sensitivity coefficients for variation-aware parasitic capacitance extraction, the method comprising:

receiving interconnect technology data which includes:

nominal parameter values for an interconnect layer, wherein the nominal parameter values characterize semiconductor manufacturing processes that are used to manufacture the interconnect layer, and parameter-variation coefficients which represent variations in the nominal parameter values due to random process variations;

receiving an interconnect template which describes a geometry of a portion of the interconnect layer;

determine an nominal capacitance value and capacitance sensitivity coefficients for the interconnect template using the interconnect technology data, wherein the determining, involves:

determine a set of discretized elements using the interconnect template;

determine a coefficient matrix which represents a relationship between the discretized element charges and the discretized element voltages;

factorize the coefficient matrix into a set of matrix factors;

determine a nominal the nominal capacitance value using the set of matrix factors, wherein the nominal capacitance value characterizes a capacitance of the interconnect template; and reuse the set of matrix factors to determine the capacitance sensitivity coefficients which represent the sensitivities of the nominal capacitance value to variations in nominal parameter values;

storing the nominal capacitance value and the capacitance sensitivity coefficients data in a storage.

* * * * *